United States Patent
Bottega

(10) Patent No.: US 7,717,144 B1
(45) Date of Patent: May 18, 2010

(54) DEVICE FOR APPLYING SALT AND MELTED BUTTER INTO POPCORN

(76) Inventor: Philip M. Bottega, 39 Wellesley Way, Freehold, NJ (US) 07728

( * ) Notice: Subject to any disclaimer, the term of this patent is extended or adjusted under 35 U.S.C. 154(b) by 470 days.

(21) Appl. No.: 11/789,099

(22) Filed: Apr. 23, 2007

(51) Int. Cl.
*B65B 39/00* (2006.01)
*A23B 4/28* (2006.01)

(52) U.S. Cl. .................... 141/338; 141/337; 99/487
(58) Field of Classification Search ......... 141/331–345; 99/487; 220/703–709
See application file for complete search history.

(56) References Cited

U.S. PATENT DOCUMENTS

| | | | | |
|---|---|---|---|---|
| 2,100,888 A | * | 11/1937 | Vine | 141/337 |
| 2,302,591 A | * | 11/1942 | Ahern | 239/654 |
| 2,902,062 A | * | 9/1959 | Von Smekal | 141/105 |
| 3,428,460 A | | 2/1969 | Ely | |
| 3,804,134 A | * | 4/1974 | Wehking | 141/98 |
| 4,050,484 A | * | 9/1977 | Danyo | 141/34 |
| 4,648,506 A | | 3/1987 | Campbell | |
| 5,065,927 A | | 11/1991 | Wahl et al. | |
| 5,263,255 A | | 11/1993 | Watson | |
| 5,440,976 A | * | 8/1995 | Giuliano et al. | 99/485 |
| 5,718,681 A | * | 2/1998 | Manning | 604/518 |
| 6,154,891 A | * | 12/2000 | Wilson | 4/144.4 |
| 2005/0244549 A1 | | 11/2005 | Ling | |

\* cited by examiner

*Primary Examiner*—Timothy L Maust
(74) *Attorney, Agent, or Firm*—Richard L. Miller

(57) ABSTRACT

A device for applying salt and melted butter into popcorn which comprises a perforated straw-like component having a sealed lower end. A funnel component is integral with an upper end of the perforated straw-like component. When the perforated straw-like component is inserted into the popcorn, salt and melted butter will be poured into the funnel component and flow out through the perforated straw-like component into the popcorn.

3 Claims, 2 Drawing Sheets

US 7,717,144 B1

DEVICE FOR APPLYING SALT AND MELTED BUTTER INTO POPCORN

BACKGROUND OF THE INVENTION

1. Field of the Invention

The present invention relates to a food applicator, and more particularly, a device for applying salt and melted butter into popcorn.

2. Description of the Prior Art

Numerous innovations for condiment dispensers have been provided in the prior art that will be described. Even though these innovations may be suitable for the specific individual purposes to which they address, however, they differ from the present invention.

A FIRST EXAMPLE, U.S. Pat. No. 3,428,460, Issued on Feb. 18, 1969, to Ely teaches a container adapted for stirring a beverage including an elongated member defining cavities containing beverage additives. The cavities are closed by a cover strip allowing selective mixing of an additive with the beverage.

A SECOND EXAMPLE, U.S. Pat. No. 4,648,506, Issued on Mar. 10, 1987, to Campbell teaches a package with spreader that is hermetically sealed for storing relatively stiff spreadable materials such as butter until ready for use. The package includes a base having a relatively stiff spreader blade partially defined by a blade spread side surface and an opposed base supply side. The base also includes a deformable blister for holding the spreadable material. The blister is open through the blade to its spread side surface and extends outwardly from the blade on the supply side of the base. A peelable membrane initially seals the butter inside of the blister by being in sealing relation to the spread side surface of the blade. A portion of the membrane is manually peelable from sealing relation with respect to part of the blade and uncovers a portion of the blister to provide a butter delivery opening through which the butter can be forced by digital pressure on the outside of the blister. The butter can then be immediately spread using the sealing side surface of the blade.

A THIRD EXAMPLE, U.S. Pat. No. 5,065,927, Issued on Nov. 19, 1991, to Wahl et al. teaches an apparatus for dispensing melted butter into a container of popcorn having a mechanism in which the melted butter will be sprayed evenly throughout the popcorn.

A FOURTH EXAMPLE, U.S. Pat. No. 5,263,255, Issued on Nov. 23, 1993, to Watson teaches an elongated, trough-like utensil for eating buttered popcorn by scooping it from a container. Long enough to reach into a deep container, one end of the utensil includes a finger stop which can be held between the middle and index fingers. The finger stop also forms a dam to prevent grease or melted butter on the popcorn from coming into contact with the fingers. Distal from the stop, the trough has a rounded end which provides a smooth surface to facilitate thrusting the trough into popcorn. Near the rounded end, the bottom of the trough defines an aperture of sufficient size to allow unpopped kernels of corn to escape from the trough before they can slide down it and into a user's mouth.

A FIFTH EXAMPLE, U.S. Patent Office Document No. 2005/0244549 A1, Published on Nov. 3, 2005, to Ling teaches a disposable prefilled food condiment dispenser that includes an elongated hollow agitator having an openable end and another end connected to a reservoir filled with a food condiment, such as popcorn topping. A food container clip may extend from the agitator or the reservoir to removably attach the dispenser to a food container. The openable end of the elongated hollow agitator preferably has an opening and a removable cap or seal to close the opening. Popcorn topping, e.g. butter, can easily be distributed throughout a popcorn bag, box or bucket, all at once, or periodically, depending upon the preferences of the user. The dispenser is portable, and it does not require the shaking of the container and associated spilling of popcorn. Also, different flavors and different caloric choices may be provided.

It is apparent now that numerous innovations for condiment dispensers have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a device for applying salt and melted butter into popcorn that avoids the disadvantages of the prior art.

ANOTHER OBJECT of the present invention is to provide a device for applying salt and melted butter into popcorn that is simple and inexpensive to manufacture.

STILL ANOTHER OBJECT of the present invention is to provide a device for applying salt and melted butter into popcorn that is simple to use.

BRIEFLY STATED, STILL YET ANOTHER OBJECT of the present invention is to provide a device for applying salt and melted butter into popcorn which comprises a perforated straw-like component having a sealed lower end. A funnel component is integral with an upper end of the perforated straw-like component. When the perforated straw-like component is inserted into the popcorn, salt and melted butter will be poured into the funnel component and flow out through the perforated straw-like component into the popcorn.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALLING OF REFERENCE NUMERALS UTILIZED IN THE DRAWING

Figure 1:
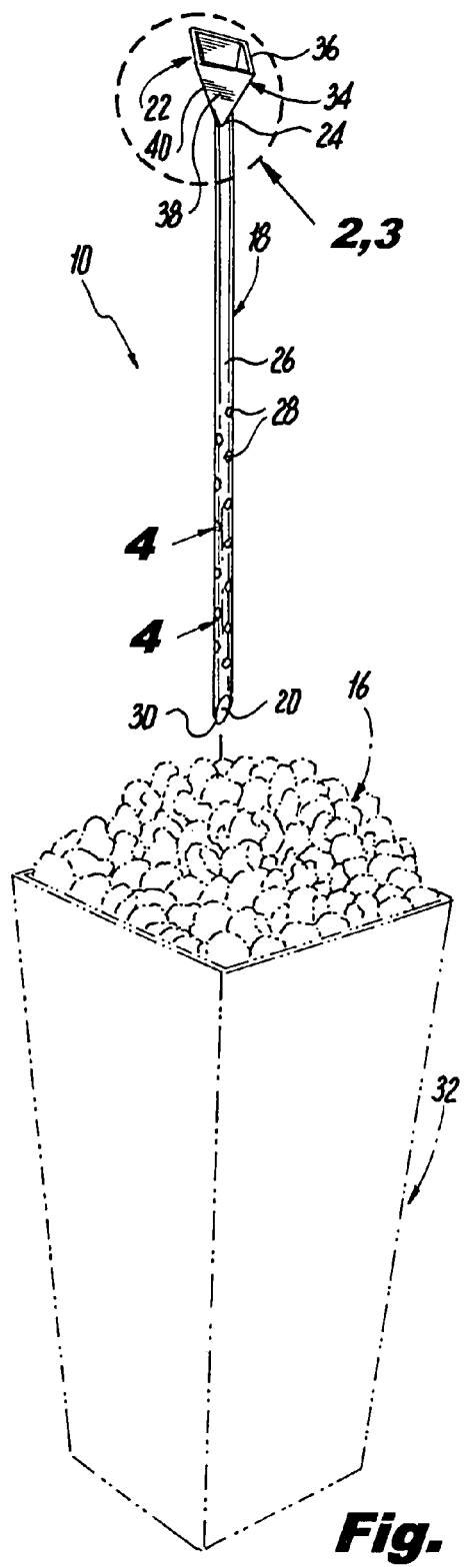
FIG. 1 is a diagrammatic perspective view showing an embodiment of the present invention ready to be inserted into popcorn in a container.
Figure 2:
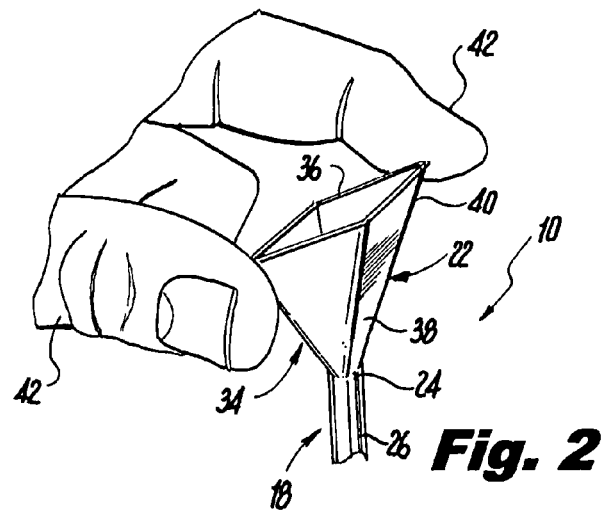
FIG. 2 is a diagrammatic perspective view of the area enclosed in the dotted circle indicated by arrow 2 in FIG. 1, showing the funnel component being squeezed so as to expand it into an open state.
Figure 3:
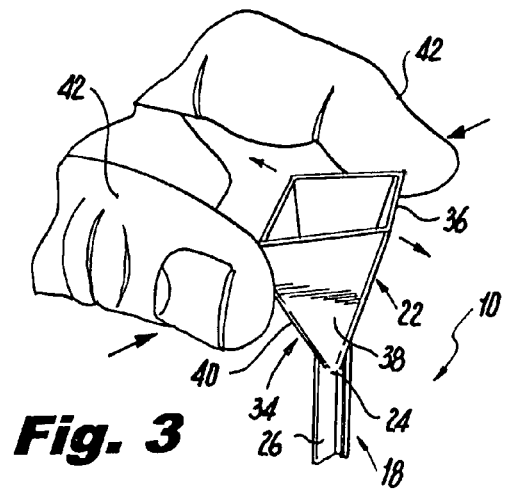
FIG. 3 is a diagrammatic perspective view of the area enclosed in the dotted circle indicated by arrow 3 in FIG. 1 showing the funnel component fully expanded.

| | |
|---|---|
| 10 | device |
| 12 | salt |
| 14 | melted butter |
| 16 | popcorn |
| 18 | perforated straw-like component of device 10 |
| 20 | sealed lower end of perforated straw-like component 18 |
| 22 | funnel component of device 10 |
| 24 | upper end of perforated straw-like component 18 |
| 26 | elongated slender hollow tube of straw-like component 18 |
| 28 | hole in elongated slender hollow tube 26 |
| 30 | beveled tip at sealed lower end 20 |
| 32 | container to hold popcorn 16 |
| 34 | hollow inverted pyramidal shaped member for funnel component 22 |
| 36 | polygonal mouth of hollow inverted pyramidal shaped member 34 |
| 38 | triangular panel section of hollow inverted pyramidal shaped member 34 |
| 40 | fold edge of funnel component 22 |
| 42 | finger of person 22 |
| 44 | durable waterproof material of device 10 |
| 46 | plastic for durable waterproof material 44 |
| 48 | securing mechanism of device 10 |
| 50 | side of container 32 |
| 52 | adhesive pad for securing mechanism 48 |

DETAILED DESCRIPTION OF THE PREFERRED EMBODIMENT

Referring now to the figures, in which like numerals indicate like parts, and particularly to FIGS. 1 through 6, which are a diagrammatic perspective view showing an embodiment of the present invention ready to be inserted into popcorn in a container; a diagrammatic perspective view of the area enclosed in the dotted circle indicated by arrow 2 in FIG. 1, showing the funnel component being squeezed so as to expand it into an open state; a diagrammatic perspective view of the area enclosed in the dotted circle indicated by arrow 3 in FIG. 1, showing the funnel component fully expanded; an enlarged diagrammatic cross sectional view, taken on line 4-4 in FIG. 1, showing the holes in the elongated slender hollow tube in greater detail; a diagrammatic elevational view showing the perforated straw-like component inserted into the popcorn with salt being poured therein; and a diagrammatic elevational view showing the perforated straw-like component inserted into the popcorn with hot butter being poured therein, and as such, will be discussed with reference thereto.

The present invention is a device 10 for applying salt 12 and melted butter 14 into popcorn 16 which comprises a perforated straw-like component 18 having a sealed lower end 20. A funnel component 22 is integral with an upper end 24 of the perforated straw-like component 18. When the perforated straw-like component 18 is inserted into the popcorn 16, salt 12 and melted butter 14 will be poured into the funnel component 22 and flow out through the perforated straw-like component 18 into the popcorn 16.

The perforated straw-like component 18 comprises an elongated slender hollow tube 26 having a plurality of holes 28 therealong to allow the salt 12 and melted butter 14 to exit from the holes 28. The sealed lower end 20 of the perforated straw-like component 18 comprises a beveled tip 30 to allow for easy insertion into the popcorn 16 held in a container 32.

Figure 4:
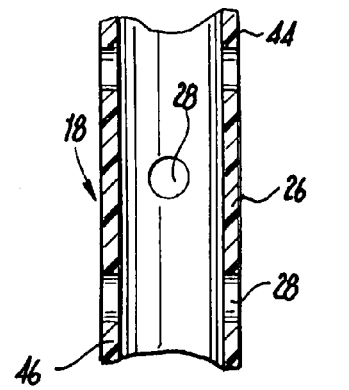
FIG. 4 is an enlarged diagrammatic cross sectional view, taken on line 4-4 in FIG. 1 showing the holes in the elongated slender hollow tube in greater detail.
Figure 6:
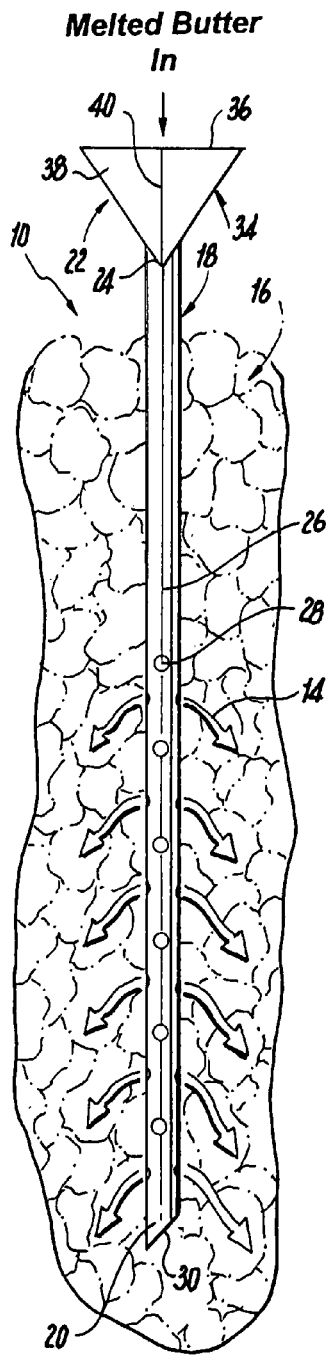
FIG. 6 is a diagrammatic elevational view showing the perforated straw-like component inserted into the popcorn with hot butter being poured therein.
Figure 5:
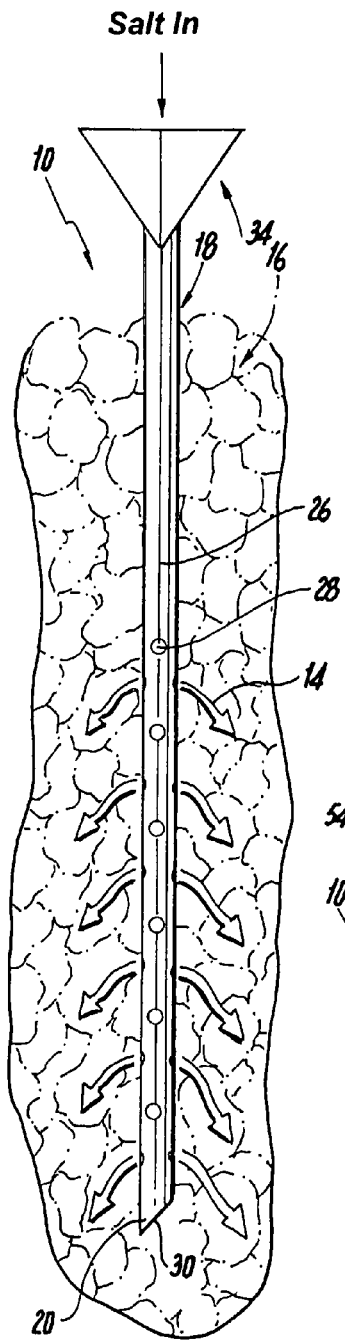
FIG. 5 is a diagrammatic elevational view showing the perforated straw-like component inserted into the popcorn with salt being poured therein.

The funnel component 22 comprises a hollow inverted pyramidal shaped member 34 having a polygonal mouth 36. The hollow inverted pyramidal shaped member 34 of the funnel component 22 comprises four triangular panel sections 38. The funnel component 22 further comprises four fold edges 40. Each fold edge 40 is located between two of the triangular panel sections 38. The funnel component 22 is in a normally collapsed flat condition until fingers 42 of a person squeezes two opposite fold edges 40 towards each other, to open the funnel component 22 for use. As shown in FIG. 4, the device 10 is fabricated out of a durable waterproof material 44, wherein the durable waterproof material 44 is plastic 46.

Figure 7:
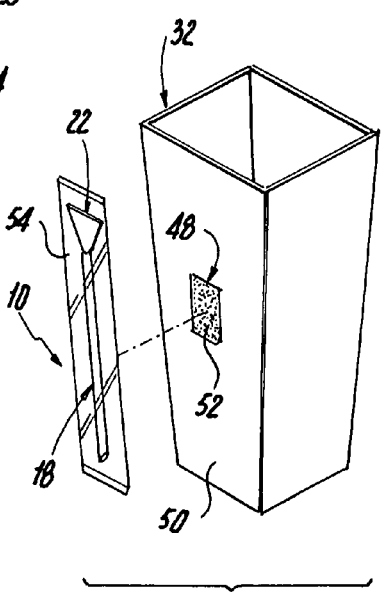
FIG. 7 is a diagrammatic exploded perspective view showing the invention in a package and ready to be secured to the popcorn container.

FIG. 7 is a diagrammatic exploded perspective view showing the invention in a package and ready to be secured to the popcorn container, and as such, will be discussed with reference thereto. The device 10 further comprises a mechanism 48 for securing the device 10 to a side 50 of the popcorn container 22. The securing mechanism 48 comprises an adhesive pad 52 for holding the device 10 to the side 50 of the popcorn container 32. A package 54 is for sealing the device 10. The package 54 will engage with the adhesive pad 52 on the side 50 of the popcorn container 32.

It will be understood that each of the elements described above, or two or more together, may also find a useful application in other types of constructions differing from the types described above.

While the invention has been illustrated and described as embodiments of a device for applying salt and melted butter into popcorn, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for applying salt and melted butter into popcorn which comprises:
    a) a perforated straw-like component having a sealed lower end; and
    b) a funnel component integral with an upper end of said perforated straw-like component, wherein when said perforated straw-like component is inserted into the popcorn, salt and melted butter will be poured into said funnel component and flow out through said perforated straw-like component into the popcorn;
    wherein said perforated straw-like component comprises an elongated slender hollow tube having a plurality of holes therealong to allow the salt and melted butter to exit from the holes;
    wherein said sealed lower end of said perforated straw-like component comprises a beveled tip to allow for easy insertion into the popcorn held in a container;
    wherein said funnel component comprises a hollow inverted pyramidal shaped member having a polygonal mouth;
    wherein said hollow inverted pyramidal shaped member of said funnel component comprises four triangular panel sections;

wherein said funnel component further comprises four fold edges, in which each said fold edge is located between two of said triangular panel sections, wherein said funnel component is in a normally collapsed flat condition until fingers of a person squeezes two opposite fold edges towards each other, to open said funnel component for use;

wherein said device is fabricated out of a durable waterproof material;

wherein said durable waterproof material is plastic; further comprising means for securing said device to a side of the popcorn container.

2. The device as recited in claim 1, wherein said securing means comprises an adhesive pad for holding said device to the side of the popcorn container.

3. The device as recited in claim 2, further comprising a package for sealing said device wherein said package will engage with said adhesive pad on the side of the popcorn container.

* * * * *